US007756814B2

(12) United States Patent
Fischer et al.

(10) Patent No.: US 7,756,814 B2
(45) Date of Patent: Jul. 13, 2010

(54) METHODS AND SYSTEMS FOR CONTROLLING ACCESS TO A DATA OBJECT

(75) Inventors: Martin Fischer, Heidelberg (DE); Thorsten Pferdekamper, Walldorf (DE)

(73) Assignee: SAP AG, Walldorf (DE)

( * ) Notice: Subject to any disclaimer, the term of this patent is extended or adjusted under 35 U.S.C. 154(b) by 323 days.

(21) Appl. No.: 10/656,208

(22) Filed: Sep. 8, 2003

(65) Prior Publication Data

US 2004/0153457 A1    Aug. 5, 2004

Related U.S. Application Data

(60) Provisional application No. 60/408,901, filed on Sep. 9, 2002, provisional application No. 60/408,902, filed on Sep. 9, 2002, provisional application No. 60/408,903, filed on Sep. 9, 2002, provisional application No. 60/408,905, filed on Sep. 9, 2002, provisional application No. 60/409,593, filed on Sep. 11, 2002, provisional application No. 60/409,606, filed on Sep. 11, 2002.

(51) Int. Cl.
*G06F 7/00* (2006.01)
*G06F 17/00* (2006.01)
(52) U.S. Cl. .............................. 707/102; 707/1; 707/2; 707/8; 707/203
(58) Field of Classification Search ........................ None
See application file for complete search history.

(56) References Cited

U.S. PATENT DOCUMENTS

| 5,327,556 | A |   | 7/1994 | Mohan et al. |
| 5,504,900 | A | * | 4/1996 | Raz ............................ 707/10 |
| 5,548,750 | A |   | 8/1996 | Larsson et al. |
| 5,557,792 | A | * | 9/1996 | Josten et al. ................... 707/8 |

(Continued)

FOREIGN PATENT DOCUMENTS

EP    0 499 422    8/1992

(Continued)

OTHER PUBLICATIONS

"Multi-Axial Subassemblage Testing System (Mast) Data Collection And Telepresence Systems Specification", by Daugherty et al., A Report from the National Science Foundation, George E. Brown, Jr. Network for Earthquake Engineering Simulation (NEES), Department of Civil Engineering, Institute of Technology, University of Minnesota, Jul. 15, 2002.*

(Continued)

*Primary Examiner*—Tim T. Vo
*Assistant Examiner*—Jay A Morrison
(74) *Attorney, Agent, or Firm*—Finnegan, Henderson, Farabow, Garrett & Dunner, LLP

(57) ABSTRACT

The present invention provides methods and systems for controlling access to a data object having an identifier (ID). In a computer application, before access a data object, a check is performed to determine whether an ID associated with the data object is contained in a lock object and the ID is associated with a storage location. If the ID is not contained in the lock object or if the ID is not yet associated with a storage location, the data object is accessed.

18 Claims, 9 Drawing Sheets

U.S. PATENT DOCUMENTS

| | | | |
|---|---|---|---|
| 5,566,319 | A | 10/1996 | Lenz |
| 5,748,870 | A | 5/1998 | Tims et al. |
| 5,761,660 | A * | 6/1998 | Josten et al. ............... 707/8 |
| 5,822,773 | A | 10/1998 | Pritchard et al. |
| 5,835,906 | A | 11/1998 | Hagersten et al. |
| 5,835,953 | A * | 11/1998 | Ohran ...................... 711/162 |
| 5,913,213 | A | 6/1999 | Wikstrom et al. |
| 6,088,693 | A * | 7/2000 | Van Huben et al. ............ 707/8 |
| 6,226,641 | B1 | 5/2001 | Hickson et al. |
| 6,269,382 | B1 | 7/2001 | Cabrera et al. |
| 6,324,581 | B1 * | 11/2001 | Xu et al. .................... 709/229 |
| 6,334,134 | B1 * | 12/2001 | Haderle et al. .............. 707/205 |
| 6,343,296 | B1 | 1/2002 | Lakhamraju et al. |
| 6,353,836 | B1 | 3/2002 | Bamford et al. |
| 6,405,274 | B1 | 6/2002 | Chan |
| 6,412,034 | B1 | 6/2002 | Chan |
| 6,507,853 | B2 * | 1/2003 | Bamford et al. ............. 707/203 |
| 6,557,082 | B1 * | 4/2003 | Josten et al. ................ 711/141 |
| 6,594,683 | B1 * | 7/2003 | Furlani et al. ............... 718/102 |
| 6,651,123 | B1 | 11/2003 | Hutchinson et al. |
| 6,772,155 | B1 * | 8/2004 | Stegelmann .................... 707/8 |
| 6,772,177 | B2 | 8/2004 | Hsiao et al. |
| 6,772,255 | B2 * | 8/2004 | Daynes ....................... 710/200 |
| 6,775,750 | B2 | 8/2004 | Krueger |
| 6,839,819 | B2 | 1/2005 | Martin |
| 6,850,938 | B1 * | 2/2005 | Sadjadi .......................... 707/8 |
| 6,880,102 | B1 | 4/2005 | Bridge |
| 6,944,615 | B2 * | 9/2005 | Teng et al. ..................... 707/8 |
| 6,950,834 | B2 * | 9/2005 | Huras et al. ................. 707/202 |
| 6,952,707 | B1 * | 10/2005 | Josten ..................... 707/104.1 |
| 7,028,287 | B2 | 4/2006 | Bak et al. |
| 7,036,043 | B2 | 4/2006 | Martin et al. |
| 7,222,142 | B2 | 5/2007 | Fischer et al. |
| 7,251,661 | B1 | 7/2007 | Reed et al. |
| 2001/0056425 | A1 | 12/2001 | Richard |
| 2002/0087476 | A1 | 7/2002 | Salas et al. |
| 2003/0004945 | A1 | 1/2003 | Teng et al. |
| 2003/0004975 | A1 | 1/2003 | Nakano et al. |
| 2006/0101094 | A1 | 5/2006 | Fischer et al. |
| 2006/0129768 | A1 | 6/2006 | Pferdekaemper et al. |
| 2006/0149696 | A1 | 7/2006 | Pferdekaemper et al. |
| 2006/0149736 | A1 | 7/2006 | Pferdekaemper et al. |
| 2006/0155704 | A1 | 7/2006 | Fischer et al. |

FOREIGN PATENT DOCUMENTS

| | | |
|---|---|---|
| EP | 1 283 477 | 2/2003 |

OTHER PUBLICATIONS

Stefani, Helkmut, "Datenarchivierung mit SAP," SAP Press, Galileo Press, May 2002.

Tanenbaum, Andrew S., "Modern Operating Systems," Prentice-Hall International, Inc., New Jersey, U.S.A. 1992, pp. 494-496.

Ralf Schaarschmidt, et al., "Concepts and Aspects of the Implementation of Application-oriented Archiving in Database Systems", Computer Science Research & Development vol. 13, 1998, pp. 79-89.

Ralf Schaarschmidt, et al., "Database-based Archiving in the SAP System R/3", Economics Computer Science, Friedrich Vieweg & Son Publishing House Company, 1997, 15 pages.

Office Action issued on Feb. 23, 2006, in U.S. Appl. No. 10/656,209.

Office Action issued on Jul. 14, 2006, in U.S. Appl. No. 10/656,209.

PCT Search Report for PCT/EP 03/09828 dated Mar. 19, 2004.

Martin Fischer et al., U.S. Appl. No. 10/526,747, filed Nov. 14, 2005, entitled "Methods and Systems for Moving Data Objects."

Thorsten Pferdekaemper et al., U.S. Appl. No. 10/526,748, filed Nov. 8, 2005, entitled "Methods and Systems for Data Moving Using Locks."

Thorsten Pferdekaemper et al., U.S. Appl. No. 10/526,504, filed Oct. 24, 2005, entitled "Methods and Systems for Archiving Data."

Martin Fischer et al., U.S. Appl. No. 10/526,749, filed Nov. 14, 2005, entitled "Methods and Systems for Moving Data Using Locks."

Thorsten Pferdekaemper et al., U.S. Appl. No. 10/526,750, filed Nov. 14, 2005, entitled "Methods and Systems for Controlling Access to a Data Object by Means of Locks."

Thorsten Pferdekaemper et al., U.S. Appl. No. 10/526,751, filed Nov. 14, 2005, entitled "Electronic Data Structure for Controlling Access to Data Objects Using Locks."

Cabrera, Luis-Felipe et al., "Applying Database Technology in the ADSM Mass Storage System," Proceedings of the 21st VLDB Conference, 1995, pp. 597-605.

* cited by examiner

Persistent Lock Object

| ID 1 | Archive |
|------|---------|
| AB   | 001     |
| BB   | 002     |
| BC   | 002     |
| CF   | 003     |
| ...  | ...     |

Transactional Lock Object

| ID 2 |
|------|
| AB   |
|      |
| BC   |
| CF   |
| ...  |

Table 1

| Field A | Field B | Filed C | ... | Field X |
|---------|---------|---------|-----|---------|
| A       | B       |         |     |         |
|         | B       |         |     | G       |
| B       | C       |         |     |         |
| C       | F       |         |     |         |
| ...     | ...     |         |     |         |

Table 2

| Field A | Field B | Filed C | ... | Field Y |
|---------|---------|---------|-----|---------|
| E       | L       |         |     |         |
| F       | K       |         |     |         |
|         | H       | M       |     | to Table |
| C       | F       |         |     |         |
| ...     | ...     |         |     | ...     |

Fig. 2

METHODS AND SYSTEMS FOR CONTROLLING ACCESS TO A DATA OBJECT

RELATED APPLICATION

This application claims the benefit of U.S. Provisional Patent Application Nos. 60/408,901, 60/408,902, 60/408,903 and 60/408,905, which were filed Sep. 9, 2002, and U.S. Provisional Patent Application Nos. 60/409,593 and 60/409,606, which were filed Sep. 11, 2002, all of which are hereby incorporated herein by reference.

DESCRIPTION OF THE INVENTION

1. Field of the Invention

The technical field of this invention is electronic data processing. More particularly, the present invention relates to methods, computer program products and systems for data moving.

2. Description of the Related Art

Every user of a computer is familiar with the routine process of moving data objects. One special application of moving data objects is the archiving process, during which data objects are moved from a first to a second storage location. Data may be archived for any number of reasons including, for example, safety or performance.

Enterprise resource planning (ERP) software applications may be used to control, support, and manage all aspects of an enterprise. As such, ERP software generally handles large amounts of company information from a variety of entities within the enterprise. Understandably, enterprises frequently require that the enterprise's important business information be periodically archived.

The archiving of data may be performed automatically using archiving software tools, which may be part of the enterprise's ERP software. For example, various tools for automatic archiving of data are described in Helmut Stefani, Datenarchivierung mit SAP, Galileo Press GmbH, Bonn 2002, ISBN 3-89842-212-7. Such tools can consist of a writing module, which stores (or writes) the data objects to be archived sequentially in archive files, and a deleting module, which deletes the successfully archived data from the original data object base. The writing module may select the data objects to be archived from the data base according to specific criteria such as, for example, the creation time of the data. The archival process usually does not modify the original data objects or data base. The deleting module alternatively reads the archive file sequentially and deletes the data objects found in the archive file from the original data base. This process helps to ensure that only data objects that have been readably stored in the archive file are deleted from the original data base. Generally, the length of time it takes to archive data depends on the amount of data to be archived and therefore may vary from a few milliseconds to several hours or days. Consequently, there may be a considerable time gap between writing the data into the archive file and deleting the data from the original data base. This time gap may cause one or more of the following problems.

In some cases, data modifications occurring between writing the data into the archive file and deleting the data from the original data base may not be captured, causing errors in the business processes. In the time between writing the data into the archive file and deleting the data from the original data base, the data objects are still available and may be modified during the time gap. Because conventional deleting programs do not compare the archived data object and the data object to be deleted, modifications during the time gap are not detected and can be lost. If the lost data is used by or critical to another business process, that business process may be affected or may not be completed.

Another problem may arise if several archiving processes run in parallel. In this case, one data object may be archived several times, and then becomes no longer unambiguously identifiable. This may cause evaluations or statistical analyses, which use the archive files, to produce wrong results.

In addition, data objects in the original data base may be read by the writing module and simultaneously modified by another software application. For example, after the writing module has read the data objects, one or more of the data objects may be marked as non-archiveable. In this case, data objects which the enterprise believes are not archiveable may be written into the archive file and are deleted from the original data base. In effect, this may result in a loss of data.

Thus, there is a need for a method and/or data processing system providing a more efficient solution of the problems described above.

SUMMARY OF THE INVENTION

The present invention provides methods and systems for controlling access to a data object having an identifier (ID). In a computer application, before access a data object, a check is performed to determine whether an ID associated with the data object is contained in a lock object and the ID is associated with a storage location. If the ID is not contained in the lock object or if the ID is not yet associated with a storage location, the data object is accessed.

In certain embodiments, methods and systems consistent with the present invention may be used in archiving data objects. A data object may be selected from the first storage location and assigned at least one identifier (ID). The at least one ID is stored in at least one lock object. The data object is stored at the second storage location and the second storage location is associated with the at least one ID in the at least one lock object. The data object is then deleted the from the first storage location and the at least one ID is deleted from the at least one lock object after the storing of the data object in the second storage location has been completed.

In at least some embodiments, at least two identifiers of a first type and a second type are assigned to the data object. In this case, the first type of ID may be stored in a first lock object and the second type of ID may be stored in a second lock object. The first type of ID is deleted from the first lock object after the data object has been deleted from the first storage location and the second type of ID is deleted from the second lock object after the data object has been stored in the second storage location.

In certain embodiments, methods and systems consistent with the present invention can check, by querying the lock object, whether the data to be accessed is subject to a moving process or not. If yes, the access to that data can be postponed until the moving is completed.

In some embodiments, methods and systems consistent with the present invention checking whether the data has been completely stored in the second storage location before deleting the data object from the first storage location or deleting the at least one ID from the lock object.

BRIEF DESCRIPTION OF THE DRAWINGS

The accompanying drawings, which are incorporated in and constitute a part of this specification, illustrate examples of embodiments of the invention and, together with the description, explain the principles of the invention. In the drawings.

FIG. 2 is a diagram of one exemplary structure of a data object in accordance with the principles of the present invention.

DETAILED DESCRIPTION

Figure 1:
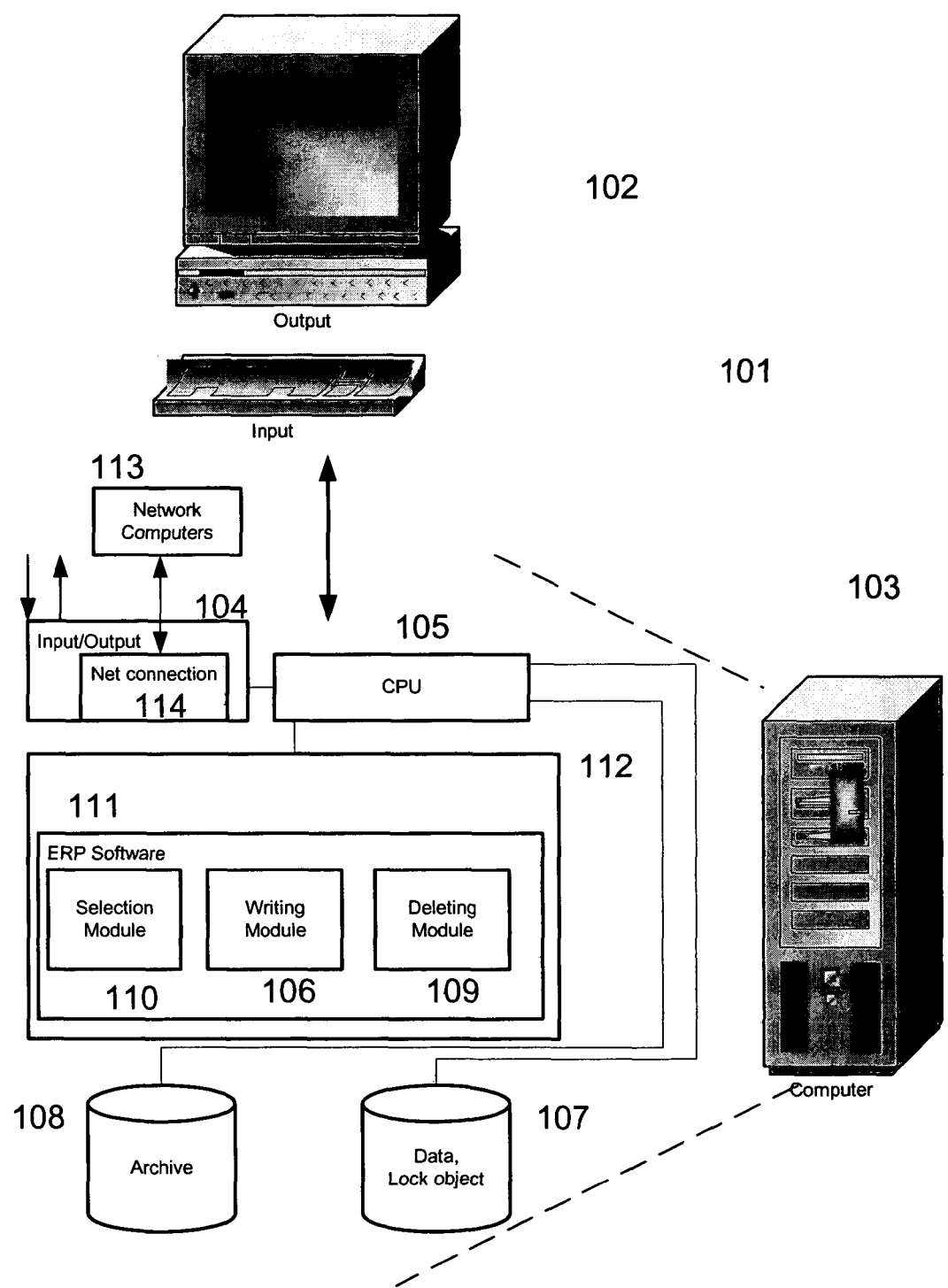
FIG. 1 is a schematic block diagram of one exemplary embodiment of the present invention.

Computer systems and the programs that control them are closely related. As used herein, phrases such as "the computer provides," "the program provides or performs specific actions", and "a user performs a specific action" are used to describe actions by a computer system that are controlled by a program or to indicate that the program or program module is designed to enable the computer system to perform the specific action or to enable a user to perform the specific action by a computer system. A computer system can be a stand-alone computer, such as a PC or a laptop, or a series of computers connected as a network, such as a network within a company or a series of computers connected via the internet.

Reference will now be made in detail to the principles of the invention by explaining the invention on the basis of an archiving process, examples of which are illustrated in the accompanying drawings. Examples, mentioned therein, are intended to explain the invention and not to limit the invention in any kind. Within this application, the terms used shall have their usual meaning in the context of the field of data processing unless defined otherwise herein.

A computer system can be a stand alone computer such as a PC or a laptop or a series of computers connected as a network such as, for example, a network within a company or a series of computers connected via the internet. A data object to be archived can be any kind or type of data such as, for example, numerical or textual data, image data, meta data, irrespective whether the data are implemented as whole files or parts of files or fields in tables, irrespective whether they are stored in volatile memory or nonvolatile memory. As an example, data objects according to the present invention can be implemented as one or more fields of one or more tables, particularly of tables of a relational data base system, or as objects in an object orientated programming language.

ERP software may comprise any software application that supports the business processes of an enterprise.

A storage location is any volatile or nonvolatile storage means accessible by the computer system. It can be any kind of computer storage means known to one of ordinary skill such as, for example, RAM, magnetic or optical storage, such as floppy disk, hard disk, MO-Disk, CD-ROM, CD RW, DVD ROM, DVD RW, etc. In certain embodiments, the first and second storage locations can be the same. In this case, the archived data objects may be stored in a location other than the location where the original data objects will be archived. The second storage location may also be implemented as a file, located anywhere in an accessible nonvolatile storage means. Such file is subsequently referred to as the archive file.

An identifier (ID) is a type of data which allows an unambiguous identification of the data object to be archived. An identifier may be, for example, a number, a combination of alphanumerical characters, or a characteristic part of the data object to be archived. Data object s may have a wide variety of IDs. A lock object is a data object, in which the identifiers are stored. It can be implemented as, for example, a file on a storage means or as a data array in computer memory. In certain embodiments, a first lock object may be stored in a nonvolatile storage means and a second lock object may be stored in volatile and/or nonvolatile storage means.

The assignment of the second storage location to an ID can be implemented using a table. For example, in one embodiment, one field of a line of the table may contain the ID and another field of the line may contain a link to the second storage location, such as a file name. This table can be stored as a file on a nonvolatile storage means.

FIG. 1 is a schematic block diagram of one exemplary embodiment of the present invention. FIG. 1 shows a computer system 101 comprising a computer 103 having a CPU 105, a working storage 112, in which ERP software 111 may be stored for use by CPU 105. ERP software 111 may comprise program modules 106, 109, and 110 for carrying out a data archiving process consistent with the present invention. Computer system 101 may further comprise input means 113, output means 112 for interaction with a user, and general input/output means 104, including a net connection 114, which may be used for sending and receiving data. A plurality of computer systems 101 can be connected via net connection 114 to form a network 113. In this case, network computers 113 can be used as further input/output means, including as further storage locations. Computer system 103 may further comprise a first storage means 107, in which data to be archived and the lock object are stored, and a second storage means 108, in which the archived data are stored.

Program modules 106, 109, 110 may be processed by CPU 105 in order to carry out the methods consistent with the present invention. In one exemplary method, one or more data objects stored in the first storage means 107 are selected by selection module 110. Selection module 110 assigns an ID to each of the selected data objects and stores the ID in the lock object at storage location 107. Writing module 106 reads the data objects and the lock object and stores such data objects, the ID of which are contained in the lock object, to the second storage location 108. Additionally, the second storage location 108 may be assigned to the respective ID of the data object in the lock object. Deleting module 109 may then read the archived data objects in the second storage location 108 and delete the data objects, which it could successfully read from the original set of data objects in the first storage location 107. After deleting a specific data object, to which an ID was assigned, that ID is deleted from the lock object.

In an alternative embodiment, the lock object may be created by the selection module and not by the writing module.

In another embodiment consistent with the present invention, a data object to be archived may comprise one or more fields of one or more tables, and the ID of the respective object may comprise one or more key fields of that data object. As shown in FIG. 2, various sets of data objects may be created in the form of two-dimensional data arrays, i.e. two tables having columns named field A to field X and field Y, respectively, and a certain, unspecified number of lines. A field of the array or table may be defined by the name of the column and the respective line. Such field may contain data to be archived. It may alternatively contain a reference to a line of a further table. For example, in table 1 field X in line 2 contains a reference to line 3 in table 2. A data object to be archived may comprise fields of one line of the respective table. If one of the fields contains a reference to a line of another table, fields of this referenced line may also belong to the data object. In the example in FIG. 2, a data object to be archived may comprise the fields of line 2 in table 1 and fields of line 3 in table 2.

An ID can be implemented by the content of one or more so-called key fields, if the combination of these key fields is unique within the respective table. In the example shown in FIG. 2, the fields of "field A" and "field B" can be used as key fields for table 1, whereas field A alone is key field in table 2. Within this example, assigning an ID to the data object means to use the content of the fields of columns field A and B of the respective lines as the ID for that particular line. In keeping with this assignment, the IDs for the data object to be archived may be stored as a first type ID in a first type lock object called the "persistent lock object," and a second type ID in a second type lock object named "transactional lock object," as shown in FIG. 2.

The persistent lock object may be implemented as a table having two columns, the first of which contains the first type ID 1. The second type ID, ID 2, can be implemented as a one-dimensional data array stored in the working memory of the computer system. However, it may also be implemented as a file on a nonvolatile storage means. In at least one embodiment, the first type ID, ID 1, is deleted after the selected data object has been deleted. In at least one embodiment, the second type ID, ID 2, is deleted immediately thereafter. Alternatively, type ID 1 IDs can be deleted after all the selected data objects have been deleted. As can be seen in FIG. 2, both ID types comprise the ID of the respective lines of the data to be archived; however, this is not a necessary condition. In the example depicted in FIG. 2, ID 2 of line BB has been deleted, that is, this line has already been archived, whereas line BC has not yet been stored to the archive file. In certain embodiments, the two types may be stored together in one lock object. The persistent lock objects may further contain a column by which a storage location is associated with the ID of the data object to be archived. For example, referring again to FIG. 2, line 1 may be archived in a file named 001, lines 2 and 3 in file 002, and line 4 in file 003.

In certain embodiments, the selection of the data object may be implemented by an automatic procedure, such as by a simple query, that returns all lines having a certain field that satisfies a certain condition. For example, the procedure could return all lines in which the content of a date field pre-dates or post-dates a certain deadline. Selection may also be implemented by a user to whom a selection table is presented via a graphical user interface.

A further embodiment is characterized in that the IDs of the second type may be stored in a second lock object immediately after the at least one ID of a first type is associated with the data object. Alternatively, the second type of ID of the selected data object may be stored shortly before the data object is stored at the second storage location.

In certain embodiments, the IDs of the first type of all selected data objects may be stored before any data objects are stored at the second storage location.

In a further embodiment, the invention comprises checking, before or while performing any of the steps of selecting the data object from a first storage location, assigning at least one ID of at least one type to the selected data object and storing the at least one ID in a lock object) for a data object, whether an ID for a data object has been stored in a lock object, and if yes, skipping at least the step of storing the data object at the second storage location and associating the second storage location with the at least one ID in the lock object for that data object.

Additionally, the invention may comprise checking before or while performing any steps for a particular data object, whether the data object is already contained in the second storage location, and if yes, skipping one or more of the steps of storing the data object at the second storage location and associating the second storage location with the at least one ID in the lock object for that data object. The checking may be performed by querying a lock object.

In certain embodiments, checking may comprise checking whether the data object assigned to the respective ID has been completely stored in the second location and, in case of no, skipping the step of deleting the data object from the first storage location and/or deleting the at least one ID from the lock object for that data object.

Figure 3:
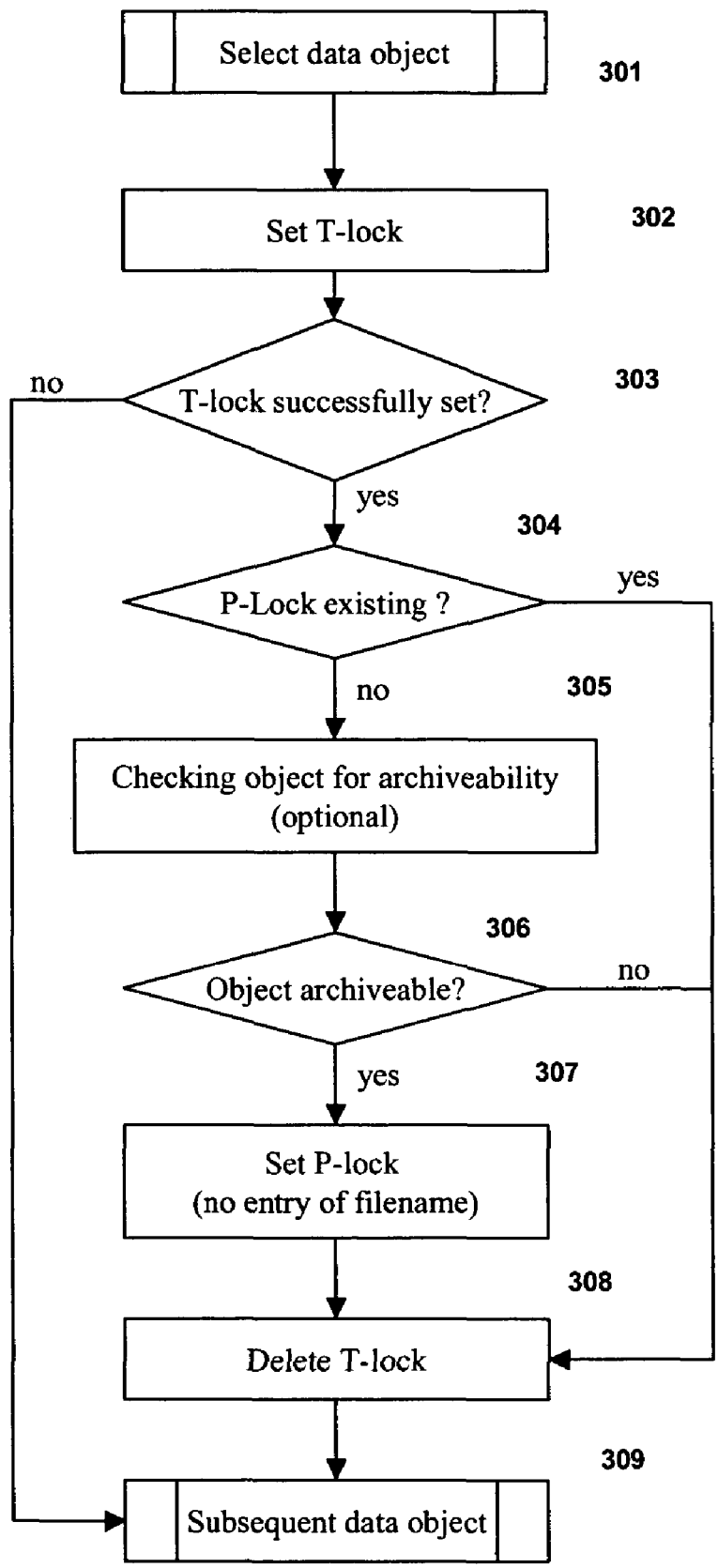
FIG. 3 is a flow diagram of one exemplary embodiment of the selection module 110 shown in FIG. 1.

The present invention will now be described in more detail with reference to FIGS. 3 to 5, which are flow diagrams of exemplary embodiments of the selection, writing and deleting modules, respectively, as shown in FIG. 1. Within the context of this description, and when referring to FIGS. 3 to 9, a first type ID is called a P-lock (permanent) and a second type ID is called a T-lock (transactional). Also, setting a P- or T-lock for a selected object means to store an ID of that object in a respective lock object. The term "permanent" refers to the fact that the P-lock exists "permanently," or as long as the data object is not yet deleted from its original storage location. The term "transactional" refers to the fact that the T-lock exists only as long as a specific action (e.g. checking of archiveability) is performed on a selected data object. In general, a T-lock is deleted shortly after a respective action has been performed.

As mentioned above, FIG. 3 is a flow diagram of one exemplary embodiment of the selection module 110 shown in FIG. 1. As shown in FIG. 3, a data object is selected in step 301. Subsequently, a T-lock is set on this object in step 302. If the T-lock was successfully set (step 303), that is, if it did not yet exist, it may be checked in step 304 whether a P-lock already exists in the selected data object. If not, the next data object may be selected in step 309. In certain embodiments, the setting of the T-lock (step 302) and the check (step 303) whether it is successfully set may be implemented as one "atomic" step. This means that both steps can be executed essentially at the same time or, in other words, the time gap between both can be essentially zero.

Both checks (steps 303 and 304) may also be implemented by querying the respective lock objects.

If a P-lock exists (step 304), the T-lock is deleted (step 308) and the next data object is selected (step 309). If no P-lock exists (step 304), it is checked in steps 305 and 306, whether the data object can be archived. Such checking may comprise a test whether the data in the data object is readable, complete, not corrupted or fraught with obvious failures, etc. If the test is successful, a P-lock may be set on that data object in step 307, whereby no archive file is associated with the data object at that point. Then the T-lock may be deleted (step 308) and the next data object may be selected (step 309).

Figure 4:
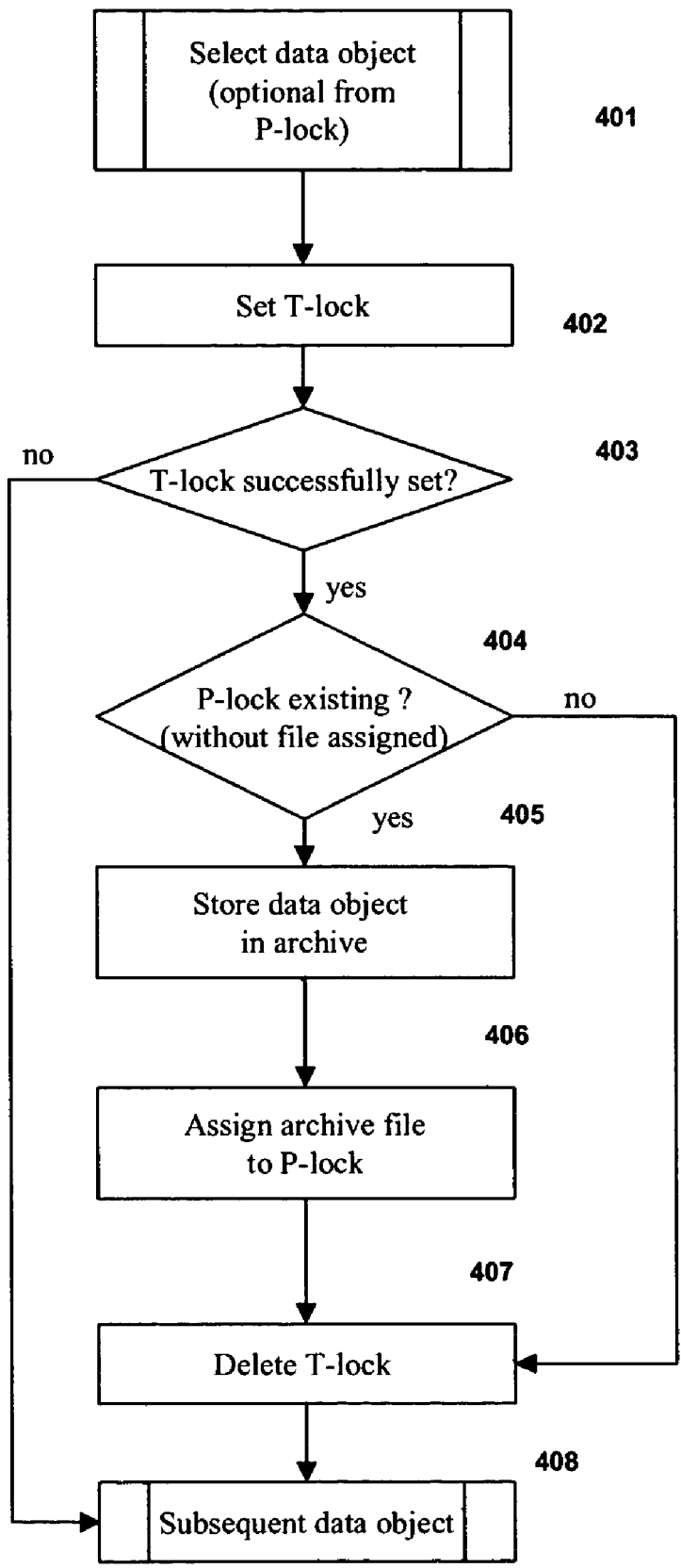
FIG. 4 is a flow diagram of one exemplary embodiment of the writing module 106 shown in FIG. 1.

FIG. 4 is a flow diagram of one exemplary embodiment of the writing module 106 shown in FIG. 1. As shown in FIG. 4, a data object is selected in a step 401. Subsequently, a T-lock is set on this object in step 402. If the T-lock was successfully set (step 403), it may be checked in step 404 whether a P-lock already exists in the selected data object, whereby no file must be assigned to that data object at that point of the process. If the condition is not fulfilled, the T-lock is deleted in step 407, and the next data object is selected in step 408. If a P-lock exists, the data object is stored in an archive file in step 405 and the archive file is associated with the data object in step 406, e.g. by adding the file name to the lock object as shown in FIG. 2. Subsequently, the T-lock is deleted (step 407), and the next data object is selected (step 408).

Figure 5:
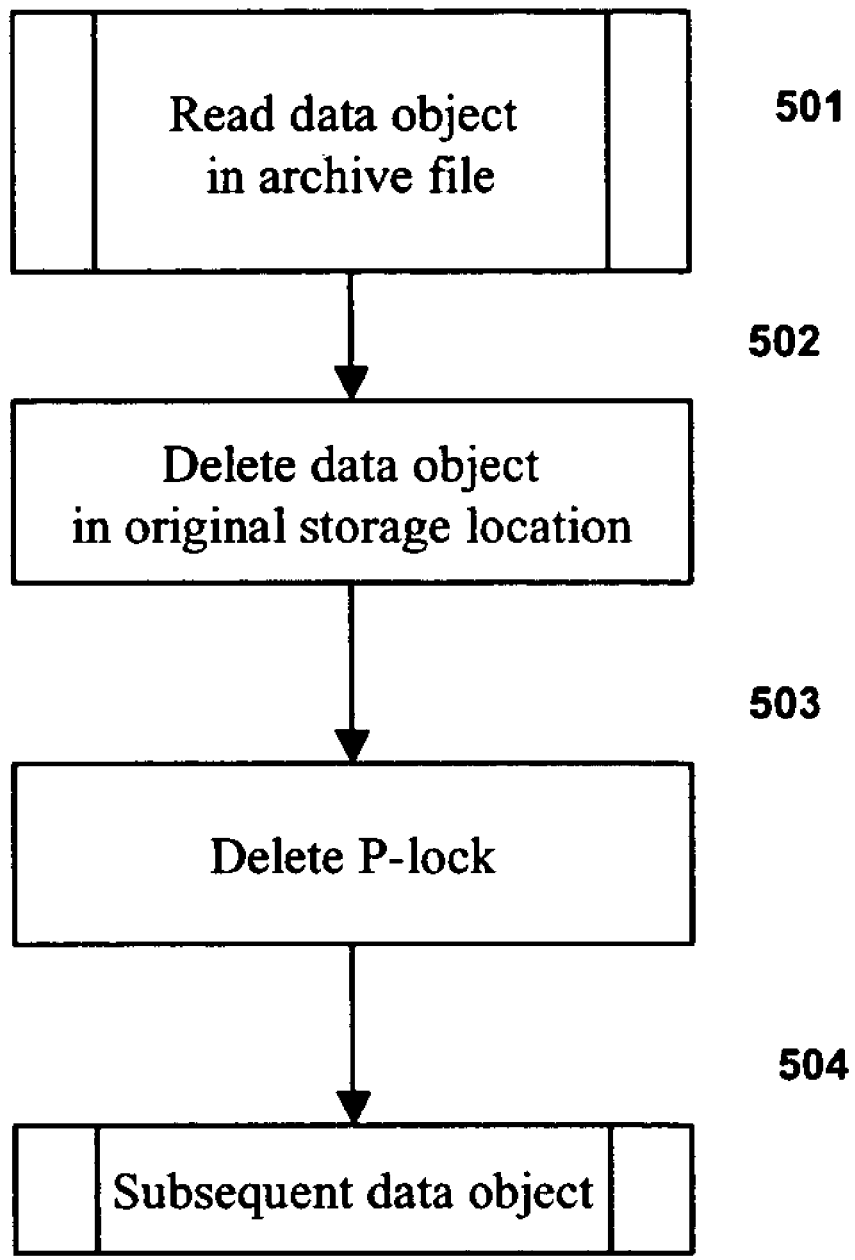
FIG. 5 is a flow diagram of one exemplary embodiment of the deleting module 109 shown in FIG. 1.

FIG. 5 is a flow diagram of one exemplary embodiment of the deleting module 109 shown in FIG. 1. In FIG. 5, a data object that has already been archived is selected (step 501). This can be implemented by checking the archive files. If a data object has been selected and successfully read from the archive file, that data object may be deleted from the original storage location (step 502), the P-lock may be deleted (step 503), and the next data object may be selected (step 504).

Figure 6:
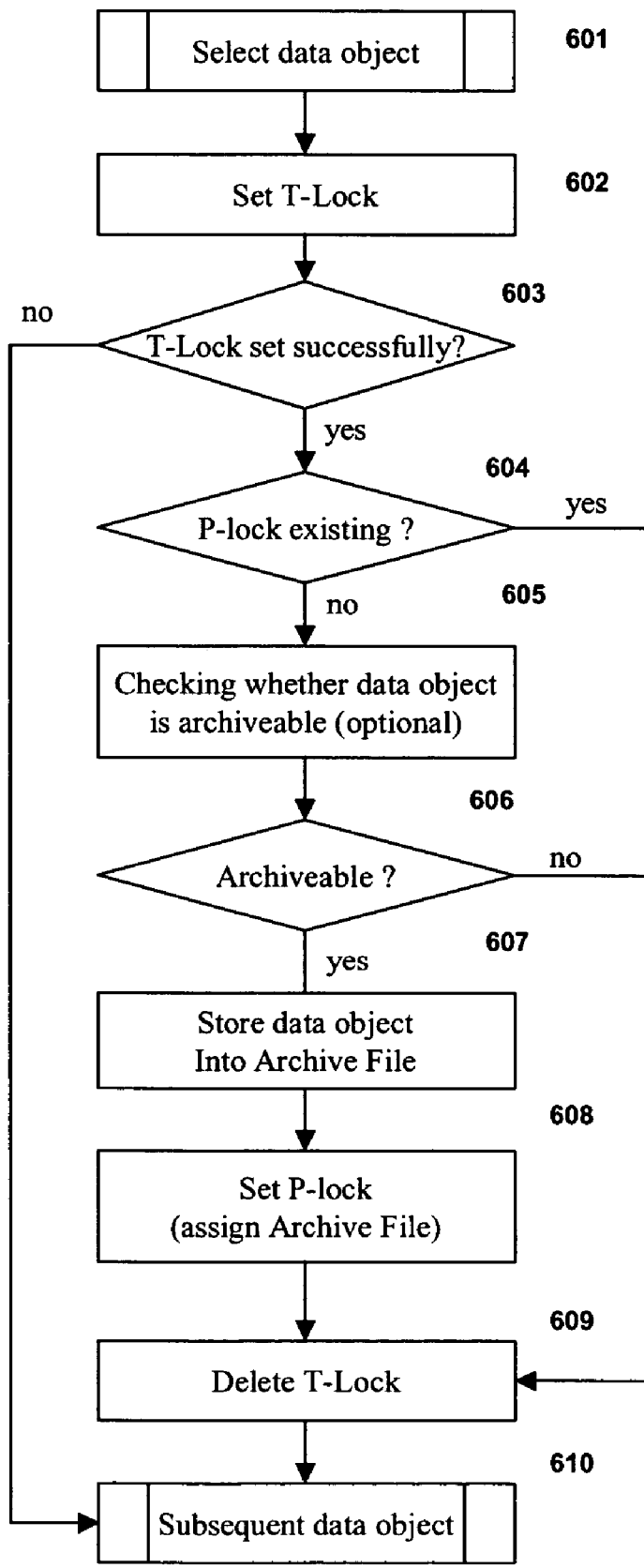
FIG. 6 is a flow diagram of one exemplary embodiment of the selection and writing modules mentioned in FIG. 1.

FIG. 6 is a flow diagram of one exemplary embodiment of the selection and writing modules mentioned in FIG. 1. In the exemplary embodiment shown in FIG. 6, the selecting and writing module described above are combined as one module. As shown, a data object is selected in step 601. Subsequently, a T-lock may be set on this object in step 602. If the T-lock was successfully set (step 603), it may be checked in step 604 whether a P-lock already exists in the selected data object. If the T-lock was not successfully set (step 603), the next data object may be selected (step 610).

If a P-lock exists on that object (step 604), the T-lock may be deleted (step 609), and the next data object may be selected (step 610). If no P-lock exists on that object (step 604), it may be checked whether the data object is archiveable (step 605). If this check fails (step 606), the T-lock may be deleted (step 609), and the next data object may be selected (step 610). If the check is positive, the data object may be stored in an archive file (step 607), a P-lock may be set with the archive file assigned (step 608), the T-lock may be deleted (step 609), and the next data object may be selected (step 610).

Figure 7:
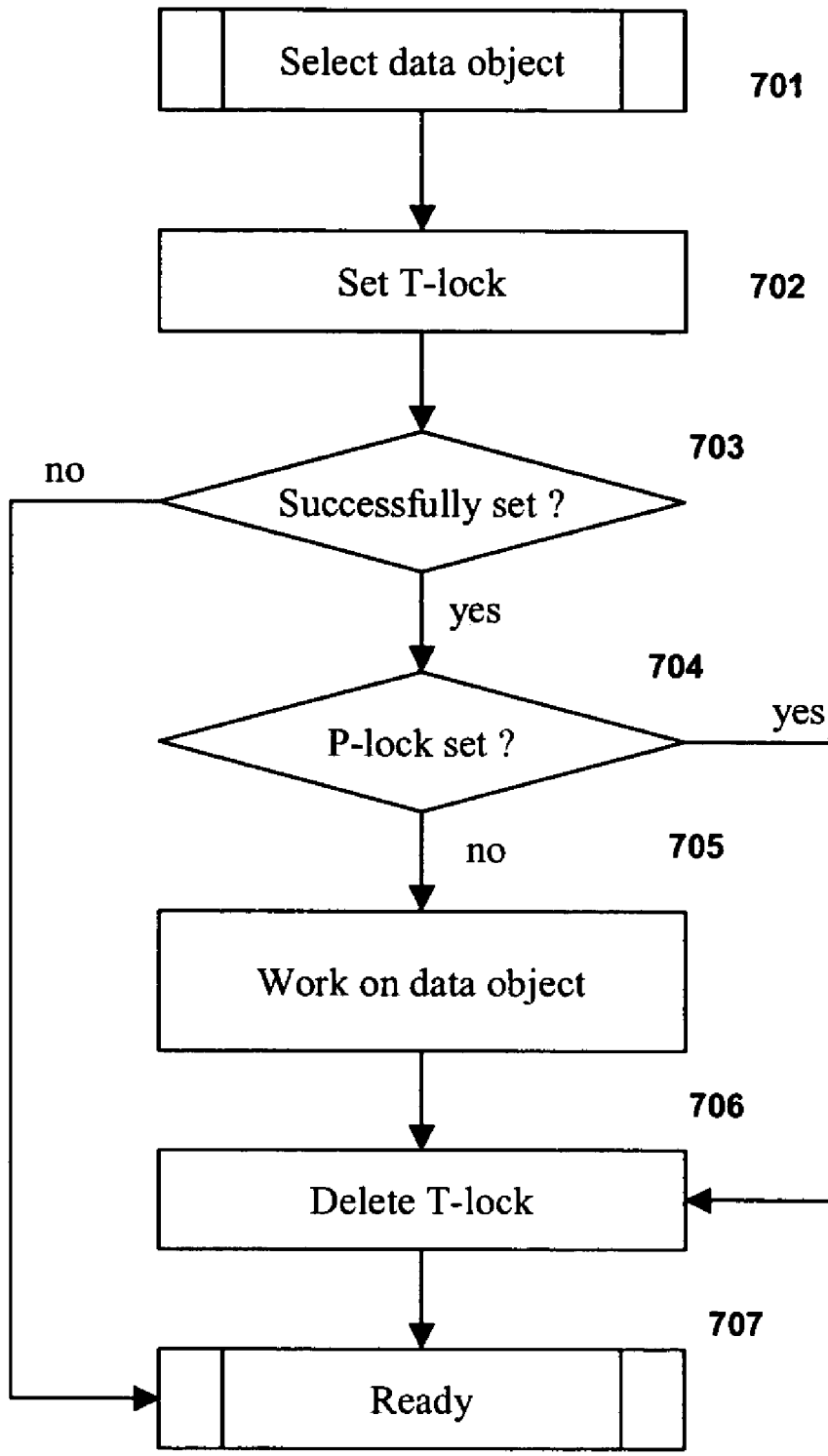
FIG. 7 is a flow diagram showing one exemplary embodiment of a software application using P- and T-locks.

FIG. 7 is a flow diagram showing one exemplary embodiment of a software application using P- and T-locks. Using principles of the present invention depicted in FIG. 7, a software application can use P- and T-locks to ensure that the measures the software application is going to apply on the data object do not influence the archiving process. For example, a software application that has read and/or write access to data objects, which can be subject of an archiving process as described, can perform one or more of the following steps. Referring to FIG. 7, in step 701, the data object is selected. Then, a T-lock may be set on that object by the application (step 702). If the T-lock is successfully set (step 703), it may be checked whether a P-lock exists on that object (step 704). If the T-lock is unsuccessful, the application may terminate (step 707). If a P-lock exists on that object (step 704), the T-lock may be deleted (step 706), and the application terminates (step 707). If no P-lock exists, for example, the data object is not subject to an archiving process, the application may have read/write access to the data object in a working step 705. Subsequently, the application may delete the T-lock (step 706) and terminate (step 707).

Figure 8:
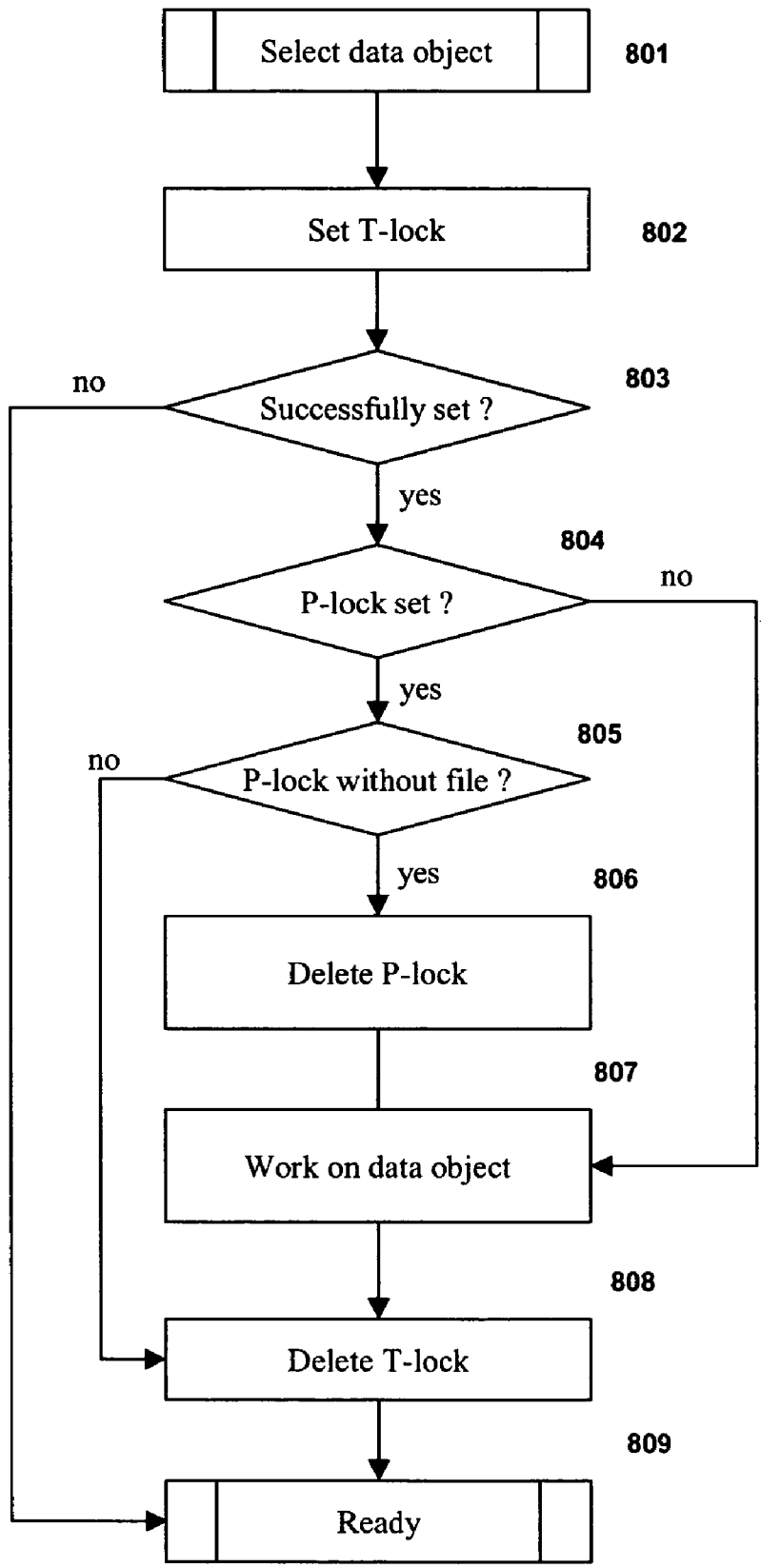
FIG. 8 is a flow diagram showing one exemplary embodiment of a software application using P- and T-locks, including a conditional deletion of a P-lock.

FIG. 8 is a flow diagram showing one exemplary embodiment of a software application using P- and T-locks, including a conditional deletion of a P-lock. In step 801, the data object is selected. Then, a T-lock may be set on that object by the application (step 802). If the T-lock is successfully set (step 803), it may be checked whether a P-lock exists on that object (step 804). If the T-lock is unsuccessful, the application terminates (step 809). If no P-lock exists (step 804), for example, the data object is not subject to an archiving process, the application may have read/write access to the data object in working step 807. Subsequently, the application deletes the T-lock (step 808), and terminates (step 809).

If a P-lock exists (step 804), it may be checked whether a file is associated with it (step 805). If a file is assigned, the application may delete the T-lock (step 808), and terminate (step 809). If no file is assigned, the P-lock may be deleted (step 806), and the application may have read/write access to the data object (step 807). Subsequently, the application deletes the T-lock (step 808), and terminates (step 809). Using this procedure, data objects which are not yet stored in an archive file can be still altered. Consequently, they can be archived only at the next archive run.

Figure 9:
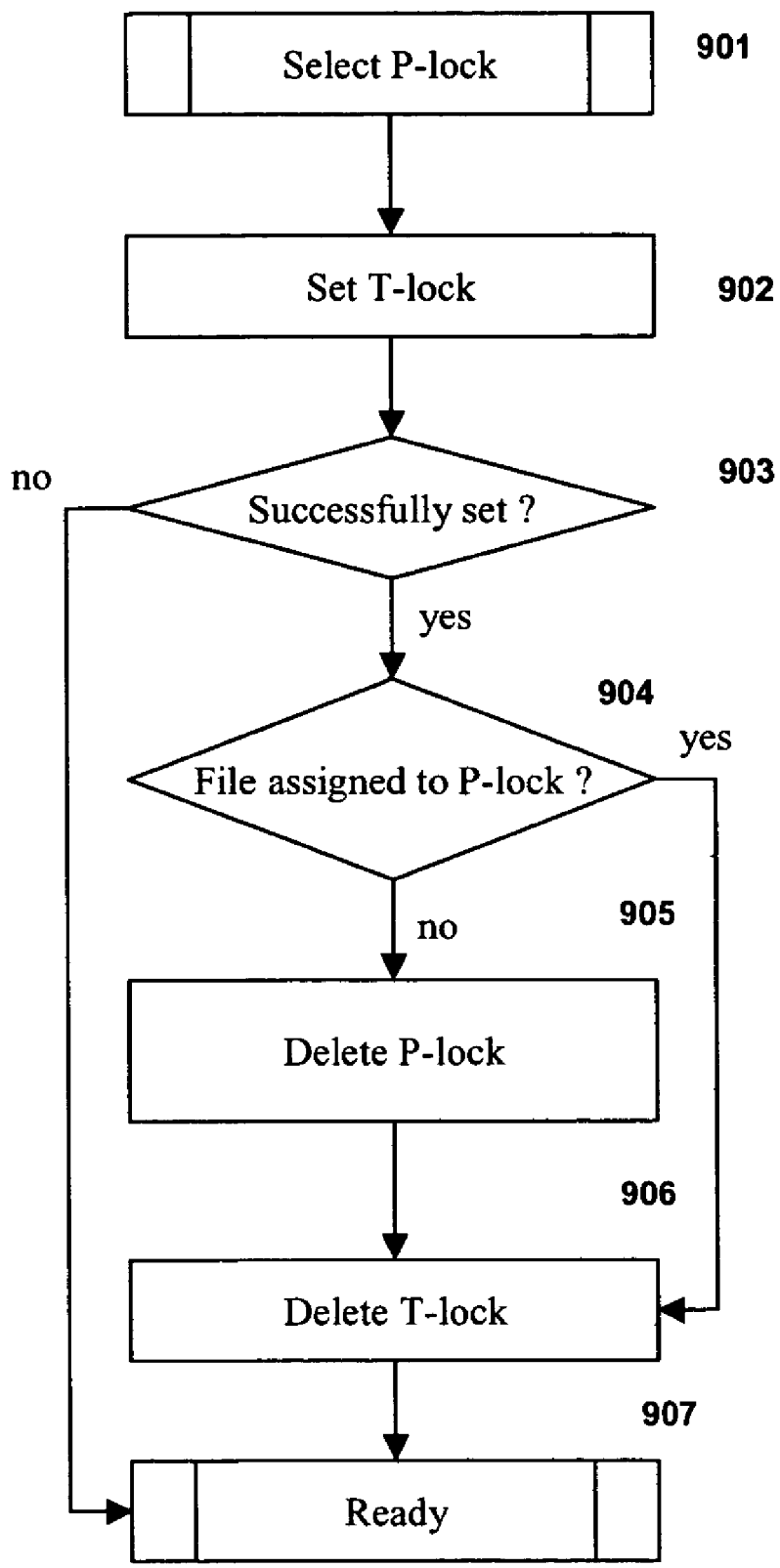
FIG. 9 is a flow diagram showing one exemplary embodiment of a software module consistent with the present invention for deleting locks.

FIG. 9 is a flow diagram showing one exemplary embodiment of a software module consistent with the present invention for deleting locks. This embodiment can be used, for example, in cases in which no archive files are assigned to P-locks or in which P-locks have been deleted for a user. In this case, a P-lock can be treated in the same way as described above. In step 901, a P-lock is selected. Then, a T-lock may be set to the P-lock in (step 902). If the T-lock is successfully set (step 903), it may be checked whether the P-lock has a file assigned (step 904). If the T-lock is not set successfully, the module terminates (step 907). If the selected P-lock has no file assigned (step 904), the P-lock may be deleted (step 905). Then, the T-lock may be deleted (step 906), and the module terminates (step 907), or a next P-lock can be selected.

Modifications and adaptations of the present invention will be apparent to those skilled in the art from consideration of the specification and practice of the invention disclosed herein. The foregoing description of an implementation of the invention has been presented for purposes of illustration and description. It is not exhaustive and does not limit the invention to the precise form disclosed. Modifications and variations are possible in light of the above teachings or may be acquired from the practicing of the invention. For example, the described implementation includes software, but systems and methods consistent with the present invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM. It is intended that the specification and examples be considered as exemplary only, with a true scope and spirit of the invention being indicated by the following claims.

Computer programs based on the written description and flow charts of this invention are within the skill of an experienced developer. The various programs or program modules can be created using any of the techniques known to one skilled in the art or can be designed in connection with existing software. For example, programs or program modules can be designed in or by means of Java®), C++, HTML, XML, or HTML with included Java applets or in SAP R/3 or ABAP.

What is claimed is:

1. A computer-implemented method for controlling access to a data object stored in a first storage location of a hardware memory device, the data object being assigned to an identifier (ID), the method comprising:

determining, using a processor, whether another process is attempting to perform a transaction with the data object by determining whether the ID is stored in a transactional lock object;

upon determining that the ID is not stored in the transactional lock object and that another process is not attempting to perform a transaction with the data object, storing the ID in the transactional lock object;

determining, using the processor, whether another process is archiving the data object to a second storage location by determining whether the ID is stored in a permanent lock object; and upon determining that the ID is not stored in the permanent lock object and that another process is not archiving the data object to the second storage location, granting access to the data object.

2. The method of claim 1, further comprising:
deleting the ID from the transactional lock object after the access to the data object is complete.

3. The method of claim 1, wherein the transactional lock object comprises a table having a first column for the ID and a second column for a link to the second storage location with assigned to the ID.

4. The method of claim 1, wherein the data object comprises one or more fields of one or more tables and wherein the ID comprises one or more key fields of the one or more tables.

5. The method of claim 1, further comprising;
upon determining that the ID is stored in the permanent lock object, determining whether the ID stored in the permanent lock object is assigned to the second storage location; and upon determining that the ID in the permanent lock object is not assigned to the second storage location, deleting the ID from the permanent lock object and granting access to the data object.

6. The method of claim 1, further comprising:
upon determining that the ID is stored in the permanent lock object and that another process is archiving the data object, denying access to the data object.

7. A computer system for controlling access to a data object stored in a first storage location, the data object being assigned to an identifier (ID), the computer system comprising:

memory having program instructions;

storage means for storing data;

at least one processor to execute the program instructions to perform a method comprising:

determining whether another process is attempting to perform a transaction with the data object by determining whether the ID is stored in a transactional lock object;

upon determining that the ID is not stored in the transactional lock object and that another process is not attempting to perform a transaction with the data object, storing the ID in the transactional lock object;

determining whether another process is archiving the data object to a second storage location by determining whether the ID is stored in a permanent lock object; and upon determining that the ID is not stored in the permanent lock object and that another process is not archiving the data object to the second storage location, granting access to the data object.

8. The computer system of claim 7, wherein the method further comprises:
deleting the ID from the transactional lock object after the access to the data object is complete.

9. The computer system of claim 7, wherein the transactional lock object comprises a table having a first column for the ID and a second column for a link to the second storage location assigned to the ID.

10. The computer system of claim 7, wherein the data object comprises one or more fields of one or more tables and wherein the ID comprises one or more key fields of the one or more tables.

11. The computer system of claim 7, wherein the method further comprises:
upon determining that the ID is stored in the permanent lock object determining whether the ID stored in the permanent lock object is assigned to the second storage location; and upon determining that the ID in the permanent lock object is not assigned to the second storage location, deleting the ID from the permanent lock object and granting access to the data object.

12. The computer system of claim 7, wherein the method further comprises:
upon determining that the ID is stored in the permanent lock object and that another process is archiving the data object, denying access to the data object.

13. A computer-readable medium comprising instructions for performing a method of controlling access to a data object stored in a first storage location of a hardware storage device, the data object being assigned to an identifier (ID), the method comprising:

determining, using a processor, whether another process is attempting to perform a transaction with the data object by determining whether the ID is stored in a transactional lock object;

upon determining that the ID is not stored in the transactional lock object and that another process is not attempting to perform a transaction with the data object storing the ID in the transactional lock object;

determining, using the processor, whether another process is archiving the data object to a second storage location by determining whether the ID is stored in a permanent lock object; and upon determining that the ID is not stored in the permanent lock object and that another process is not archiving the data object to the second storage location, granting access to the data object.

14. The medium of claim 13, wherein the method further comprises:
deleting the ID from the transactional lock object after the access to the data object is complete.

15. The medium of claim 13, wherein the transactional lock object comprises a table having a first column for the ID and a second column for a link to the second storage location assigned to the ID.

16. The medium of claim 13, wherein the data object comprises one or more fields of one or more tables and wherein the ID comprises one or more key fields of the one or more tables.

17. The medium of claim 13, wherein the method further comprises:
upon determining that the ID is stored in the permanent lock object, determining whether the ID stored in the permanent lock object is assigned to the second storage location; and upon determining that the ID in the permanent lock object is not assigned to the second storage location deleting the ID from the permanent lock object and granting access to the data object.

18. The medium of claim 17, wherein the method further comprises:
upon determining that the ID is stored in the permanent lock object and that another process is archiving the data object denying access to the data object.

* * * * *

UNITED STATES PATENT AND TRADEMARK OFFICE
CERTIFICATE OF CORRECTION

| | | |
|---|---|---|
| PATENT NO. | : 7,756,814 B2 | Page 1 of 1 |
| APPLICATION NO. | : 10/656208 | |
| DATED | : July 13, 2010 | |
| INVENTOR(S) | : Fischer et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 411 days.

Signed and Sealed this
Fifteenth Day of February, 2011

David J. Kappos
*Director of the United States Patent and Trademark Office*